(12) United States Patent
Taylor et al.

(10) Patent No.: US 8,561,740 B2
(45) Date of Patent: Oct. 22, 2013

(54) HVAC SYSTEM FOR A WORK VEHICLE

(75) Inventors: Lance A. Taylor, Wichita, KS (US); Alan G. Leupold, Plainfield, IL (US)

(73) Assignee: CNH America LLC, New Holland, PA (US)

( * ) Notice: Subject to any disclaimer, the term of this patent is extended or adjusted under 35 U.S.C. 154(b) by 330 days.

(21) Appl. No.: 13/116,495

(22) Filed: May 26, 2011

(65) Prior Publication Data

US 2012/0205072 A1    Aug. 16, 2012

Related U.S. Application Data

(60) Provisional application No. 61/463,059, filed on Feb. 11, 2011.

(51) Int. Cl.
*B60K 11/06*    (2006.01)

(52) U.S. Cl.
USPC ........................ 180/68.1; 180/68.2

(58) Field of Classification Search
USPC .................. 180/68.1, 68.2, 68.3
See application file for complete search history.

(56) References Cited

U.S. PATENT DOCUMENTS

| | | | |
|---|---|---|---|
| 2,011,840 A | 8/1935 | Arnold et al. | |
| 2,685,244 A | 8/1954 | Wahlberg et al. | |
| 2,835,183 A | 5/1958 | Miller et al. | |
| 2,852,997 A | 9/1958 | Leslie et al. | |
| 3,828,952 A * | 8/1974 | Klee | 414/697 |
| 4,341,277 A * | 7/1982 | Adamson et al. | 180/68.1 |
| 4,454,926 A * | 6/1984 | Akins | 180/68.1 |
| 4,597,323 A | 7/1986 | Mordau et al. | |
| 4,606,422 A * | 8/1986 | Jewett | 180/68.1 |
| 4,696,361 A * | 9/1987 | Clark et al. | 180/68.4 |
| 4,815,550 A * | 3/1989 | Mather et al. | 180/68.1 |
| 4,874,036 A | 10/1989 | Masuda | |
| 4,953,449 A | 9/1990 | Jackson | |
| 5,042,602 A * | 8/1991 | Nakatani et al. | 180/68.1 |
| 5,056,423 A | 10/1991 | Koukal et al. | |
| 5,277,656 A | 1/1994 | Koukal et al. | |
| 5,551,914 A | 9/1996 | Heil et al. | |
| 5,816,350 A * | 10/1998 | Akira et al. | 180/68.1 |
| 5,833,528 A | 11/1998 | Baum et al. | |
| 6,092,616 A * | 7/2000 | Burris et al. | 180/68.1 |
| 6,223,807 B1 * | 5/2001 | Asche et al. | 165/43 |
| 6,257,359 B1 * | 7/2001 | Granlund et al. | 180/68.1 |

(Continued)

FOREIGN PATENT DOCUMENTS

| | | | |
|---|---|---|---|
| JP | 356079011 A | 6/1981 | |
| JP | 361196817 A | 9/1986 | |
| JP | 401195111 A | 8/1989 | |

*Primary Examiner* — Jeffrey J Restifo
(74) *Attorney, Agent, or Firm* — Sue C. Watson

(57) ABSTRACT

An HVAC system for a work vehicle having an operator cab includes a first chamber having an for receiving airflow exterior of the cab. The inlet is adjacent to a first source for moving air for use independent of the HVAC system, the inlet arranged to cause a first change of direction of airflow inside the first chamber. The first chamber resulting in both a first air pressure reduction and a first reduction of airflow velocity while inside the first chamber sufficient to reduce an amount of particles entrained in the airflow while the particles are within the first chamber. A second chamber in fluid communication with the first chamber and configured to cause both a second change of direction and a third change of direction of airflow while inside of the second chamber prior to reaching a third chamber for mixing air flow with recirculated air from the cab.

20 Claims, 4 Drawing Sheets

(56) References Cited

U.S. PATENT DOCUMENTS

| | | |
|---|---|---|
| 6,312,327 B1 | 11/2001 | Hachmann et al. |
| 6,431,299 B1 * | 8/2002 | Asche et al. ................. 180/68.1 |
| 6,871,697 B2 * | 3/2005 | Albright et al. ................. 165/51 |
| 6,966,355 B2 * | 11/2005 | Branham et al. ................. 165/41 |
| 7,028,646 B1 * | 4/2006 | Wagner ....................... 123/41.12 |
| 8,104,559 B2 * | 1/2012 | Kisse ............................ 180/68.1 |

\* cited by examiner

HVAC SYSTEM FOR A WORK VEHICLE

RELATED APPLICATION

This application claims priority to U.S. Provisional Patent Application Ser. No. 61/463,059, filed Feb. 11, 2011, entitled "Foreign Matter HVAC Ingestion Mitigation Labyrinth", which application is hereby incorporated by reference in its entirety.

FIELD OF THE INVENTION

The present invention generally relates to HVAC systems and, more particularly, to an HVAC system for use with a work vehicle.

BACKGROUND OF THE INVENTION

A skid steer or wheel loader or other work vehicle is commonly used to load and move substantial volumes of dirt and like material from one location to another. A conventional wheel loader includes a relatively large frame that is supported for self-propelled movement over land and has a bucket or implement mounted to one end thereof. The bucket or implement can be selectively elevated to a position above side panels on a wheel loader and can be selectively tilted to "dump" materials therefrom.

To enhance operator comfort, a heating, ventilation and air conditioning (HVAC) system can be incorporated into an operator cab. Wheel loaders are often used in environments containing elevated concentrations of dust and/or moisture, which may significantly decrease the efficiency of the HVAC system, as well as reduce operator comfort. Filters, which may be used to reduce the amount of dust and/or moisture, often suffer from shortened service lives when used to directly, e.g., exterior of the work vehicle, to clean the ambient air, especially in environments having enhanced levels of airborne dust or other particulate matter.

In addition, due to the compactness of wheel loaders, the operator is positioned in close proximity to the motor and other components of the work vehicle, and thus, subjected to the noise generated by the work vehicle and components.

Thus, there is a need and a desire for an HVAC system for use with work vehicles that provides operator comfort while simultaneously achieving extended filter service lives, maintaining efficient operation and further, providing improved noise reduction.

SUMMARY OF THE INVENTION

The present invention relates to an HVAC system for a work vehicle having an operator cab including a first chamber having an inlet for receiving a flow of air exterior of the cab and an outlet. The inlet is adjacent to a first source for moving air for use independent of the HVAC system, the inlet arranged to cause a first change of direction of airflow inside the first chamber. The first chamber results in both a first air pressure reduction and a first reduction of airflow velocity while inside the first chamber sufficient to reduce an amount of particles entrained in the airflow while the particles are within the first chamber. A conduit is in fluid communication between the outlet of the first chamber and an inlet of a second chamber, the second chamber configured to cause both a second change of direction and a third change of direction of airflow while inside of the second chamber. A third chamber is configured to receive airflow from an outlet of the second chamber and to receive recirculated air from within the cab, the recirculated air brought into selective thermal heat exchange with a heat exchanger of the HVAC system by a second source for moving air. The recirculated air then enters the third chamber via an opening formed in the third chamber, the recirculated air and the airflow entering the third chamber from the second chamber mixing together. A filter is positioned interior of the cab and in fluid communication with the third chamber to remove at least a portion of remaining particles entrained in the mixed airflow.

The present invention further relates to a work vehicle including a motor secured to a frame for activating a driving device for selectably moving the frame. An operator cab is supported by the frame. An HVAC system for a work vehicle having an operator cab including a first chamber having an inlet for receiving a flow of air exterior of the cab and an outlet. The inlet is adjacent to a first source for moving air for use independent of the HVAC system, and the inlet arranged to cause a first change of direction of airflow inside the first chamber. The first chamber results in both a first air pressure reduction and a first reduction of airflow velocity while inside the first chamber sufficient to reduce an amount of particles entrained in the airflow while the particles are within the first chamber. A conduit is in fluid communication between the outlet of the first chamber and an inlet of a second chamber, the second chamber configured to cause both a second change of direction and a third change of direction of airflow while inside of the second chamber. A third chamber is configured to receive airflow from an outlet of the second chamber and to receive recirculated air from within the cab. The recirculated air is brought into selective thermal heat exchange with a heat exchanger of the HVAC system by a second source for moving air, the recirculated air then entering the third chamber via an opening formed in the third chamber. The recirculated air and the airflow enter the third chamber from the second chamber and mixing together. A filter is positioned interior of the cab and in fluid communication with the third chamber to remove at least a portion of remaining particles entrained in the mixed airflow.

The present invention yet further relates to a work vehicle including a motor secured to a frame for selectably moving the frame. An operator cab is supported by the frame. An HVAC system for a work vehicle having an operator cab includes a first chamber having an inlet for receiving a flow of air exterior of the cab and an outlet. The inlet is adjacent to a first source for moving air for use independent of the HVAC system. The inlet is arranged to cause a first change of direction of airflow inside the first chamber. The first chamber results in both a first air pressure reduction and a first reduction of air velocity while inside the first chamber sufficient to reduce an amount of particles entrained in the airflow while the particles are within the first chamber. A conduit is in fluid communication between the outlet of the first chamber and an inlet of a second chamber. The second chamber is configured to cause both a second change of direction of airflow of about 90 degrees and a third change of direction of airflow of about 90 degrees while inside of the second chamber. A third chamber is configured to receive airflow from an outlet of the second chamber and to receive recirculated air from within the cab. The recirculated air is brought into selective thermal heat exchange with a heat exchanger of the HVAC system by a second source for moving air. The recirculated air then enters the third chamber via an opening formed in the third chamber. The opening in the third chamber includes louvers facing away from an operator, the recirculated air and the airflow entering the third chamber from the second chamber mixing together. A filter is positioned interior of the cab and in fluid communication with the third chamber to remove at least a portion of remaining particles entrained in the mixed airflow.

An advantage of the present invention is an HVAC system that is arranged to provide sound reduction as perceived by the operator.

A further advantage of the present invention is an HVAC system that extends the service life of the filter used in the system.

It is to be understood that an embodiment may not incorporate all of the identified advantages.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
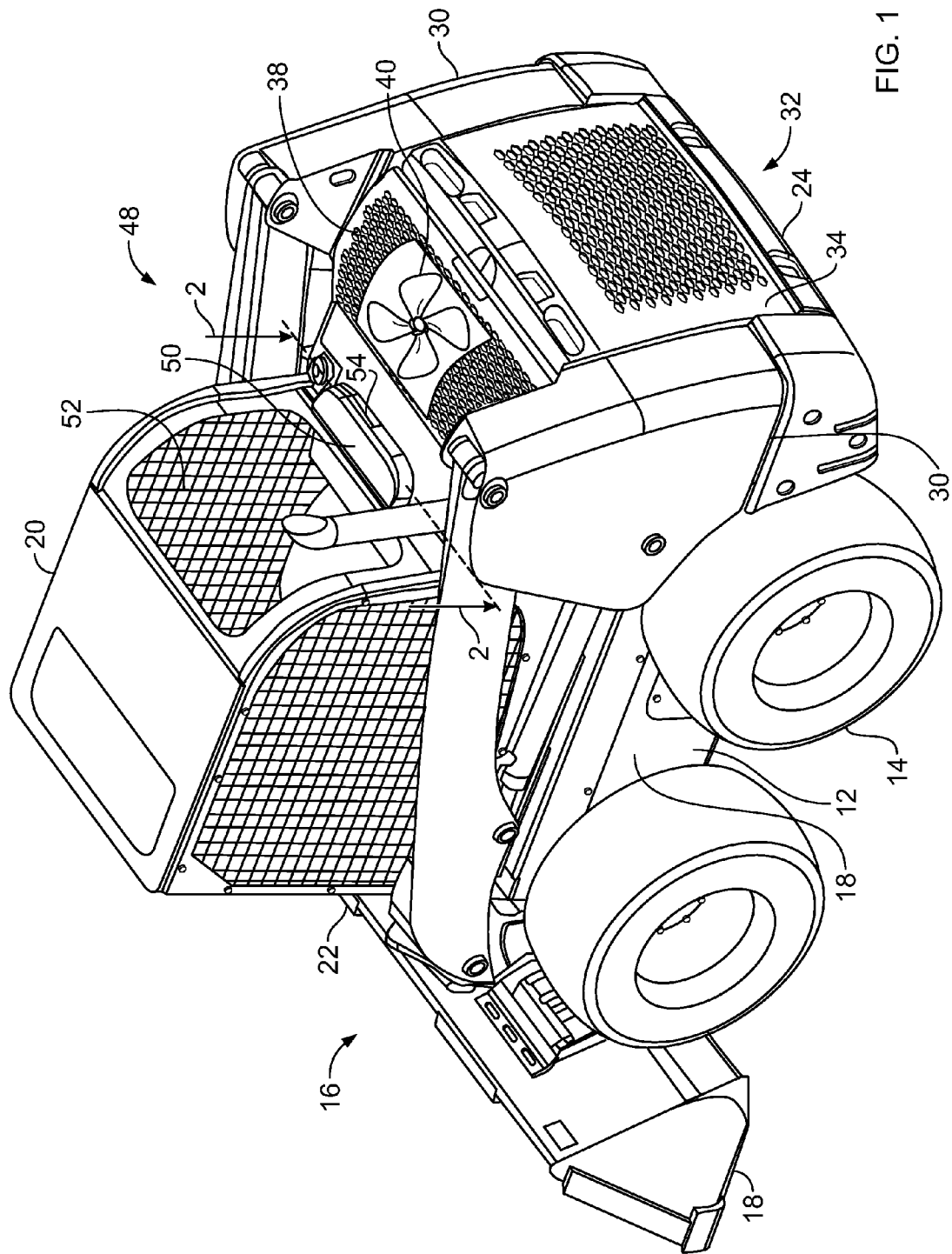
FIG. 1 is a forward-looking upper perspective view of an exemplary embodiment of a work vehicle including an HVAC system of the present disclosure.

FIG. 1 shows a work vehicle 10 provided with a frame 12 that rotatably carries a driving device 14, such as a plurality of wheels, although in another embodiment, tracks may be used or activated to selectably move the vehicle. A lifting structure 16 includes an arrangement of structural members and actuators controllable by an operator (not shown) to manipulate an implement 18 to perform work. Frame 12 structurally supports an operator cab 20 or cab to surround and protect the operator, which frame 12 includes a front end 22 facing implement 18 and an opposed back end 24 with ends 22, 24 positioned between opposed lateral sides 26, 28 of the frame. Opposed posts 30 of lifting structure 16 in close proximity to back end 24 laterally surround a compartment 32 containing components for cooling a motor (not shown) for providing power to operate vehicle 10. Compartment 32 includes panels 34, 36, with a screened openings 38 formed in panel 36 as an intake for a first source of moving air 40, such as a fan or blower for cooling components contained in compartment 32.

As shown in FIGS. 1-4, an HVAC system 48 includes a first chamber 50 positioned at least partially exterior of operator cab 20 beneath a rear window 52 of the operator cab. HVAC system 48 includes an inlet 54 for receiving a flow of ambient air 56 from exterior of operator cab 20. An arrangement of louvers 58 positioned over inlet 54 results in a first change of direction 60 of the direction of flow of ambient air 56. As further shown in FIG. 1, inlet 54 is located opposite exhaust pipe 46 to minimize operator exposure to exhaust discharged from the exhaust pipe 46. However, in other embodiments, the arrangement of the exhaust pipe can be different, and therefore, not limit the position of inlet 54 to one side of first chamber 50.

In addition, by virtue of the proximity between inlet 54 of first chamber 50 and screened openings 38, with screened openings 38 receiving a significantly greater airflow velocity and pressure than through inlet 54 during operation of the work vehicle, a flow separation occurs between inlet 54 and screened openings 38. A reason for the significantly greater airflow velocity and pressure through screened openings 38 than through inlet 54 is due to the first source of moving air 40 operating to draw significantly more airflow through compartment 32 than would be required by a second source of moving air 62 (FIG. 4) that provides airflow to HVAC system 48.

As a result of the significantly greater airflow velocity and pressure through screened openings 38 as compared with the airflow velocity and pressure through inlet 54, a comparatively greater airflow is drawn through the screened openings 38 than the airflow through inlet 54. That is, airflow associated with screened openings 38 contains a higher concentration of particulate matter, such as dust and/or moisture, than is entrained in the airflow through inlet 54. In other words, the reduced airflow velocity and pressure through inlet 54 as compared to screened openings 38 creates separated airflows between screened openings 38 and inlet 54, which separated airflows having different amounts of entrained particulate matter. Stated another way, the airflow through inlet 54 contains less particulate matter and particulate matter of a smaller size than the airflow through screened openings 38. For purposes of discussion, particulate matter and particulate matter of a smaller size or particles may include solid and/or liquid components.

Figure 2:
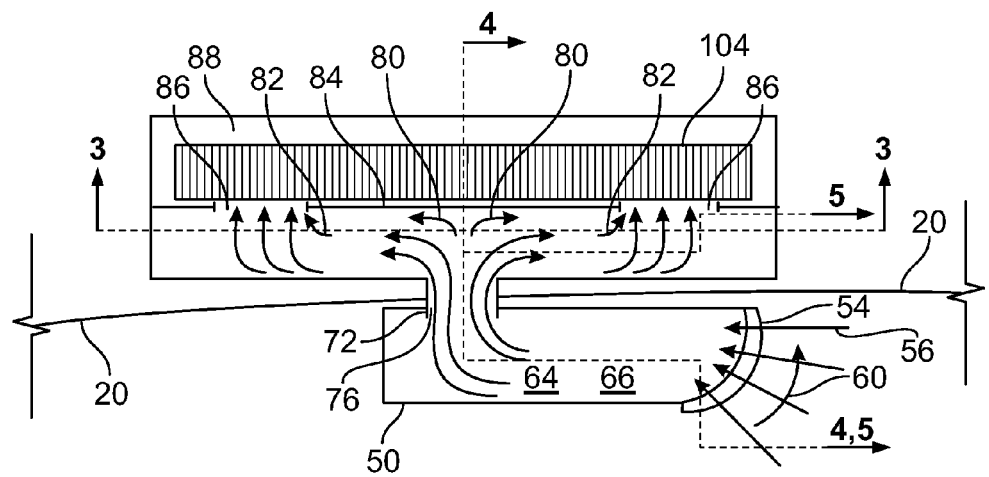
FIG. 2 is a cross-section taken along line 2-2 of FIG. 1 of the present disclosure.
Figure 3A:
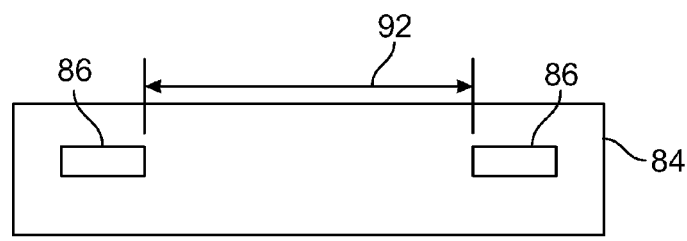
FIG. 3A is a further exemplary embodiment of a forward looking view taken along line 3-3 of FIG. 2 of the present disclosure.
Figure 3B:
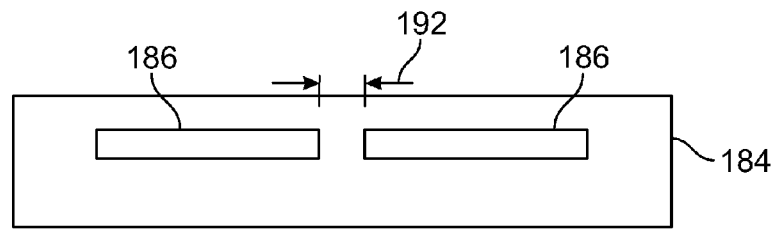
FIG. 3B is a further exemplary embodiment of a forward looking view taken along line 3-3 of FIG. 2 of the present disclosure.

As further shown in FIG. 2, airflow 56 of ambient air passes through inlet 54 and enters first chamber 50. By virtue of the first chamber 50 being sufficiently sized, airflow 56 experiences a first air pressure reduction 64 and a first reduction in airflow velocity 66 while airflow 56 is still inside first chamber 50. The first air pressure reduction 64 and the first reduction in airflow velocity 66 is sufficient to reduce an amount of particles 68 entrained in the airflow 56 while the particles 68 are within the first chamber 50. An aperture 70 formed in first chamber 50 permits particles 68 no longer entrained in airflow 56 to exit first chamber 50. In one embodiment, aperture 70 is positioned at or near a low or lowest location of first chamber 50, permitting particles 68 to exit first chamber 50 as a result of gravitational forces urging the particles toward and then through aperture 70. In one embodiment, first chamber 50 is removable from exterior of operator cab 20. In a further embodiment, substantially all liquid particles have been removed from the airflow of ambient air prior to the airflow exiting the first chamber 50.

As further shown in FIG. 2-5, airflow 56 of ambient air having a reduced number of entrained particles passes through an outlet 72 formed in first chamber 50, through a conduit 74 interconnecting outlet 72 of first chamber 50 and an inlet 76 of the second chamber 78, then through the inlet 76 of the second chamber 78 and entering the second chamber. Immediately upon entering second chamber 78, airflow 56 is subjected to a second change of direction 80 which bifurcates airflow 56 prior to airflow 56 striking the wall 84 of the second chamber 78. As shown in FIG. 2, second change of direction 80 represents about a 90 degree turn, although in other embodiments, the magnitude of the turn of airflow 56 may be greater than or less than 90 degrees. After further travel along second chamber 78, airflow 56 is subjected to a third change of direction 82 while being guided through outlets 86 formed in wall 84 of second chamber 78 and entering a third chamber 88. As shown in FIG. 3A, an exemplary embodiment of wall 84 includes a spacing 92 or distance separating outlets 86 formed in wall 84. As further shown in FIG. 3B, which is an alternate embodiment of wall 184, a spacing 192 separating outlets 186 formed in wall 184 is less than spacing 92 formed in wall 84. Despite the difference in size between spacing 92 and 192, in response to sufficient airflow, spacing 192 results in the formation of a boundary layer in three dimensions prior to the airflow achieving third change of direction 82, resulting in turbulence associated with the airflow and a desirable noise reduction as perceived by the operator. The size and shapes of both openings and spacings formed in the wall of the second chamber may vary, depending upon conditions associated with operation of the work vehicle. While third change of direction 82 of airflow 56 occurs between second chamber 78 and third chamber 88, since the third change of direction 82 is considered to begin occurring while the airflow 56 is still in second chamber 78. Therefore, the third change of direction 82 is also considered to occur while the airflow 56 is still in second chamber 78.

In another embodiment, the second chamber may be configured such that more than two changes of direction may occur in the second chamber. Such changes in direction of the airflow result in a reduction of operating noise as perceived by the operator.

Figure 4:
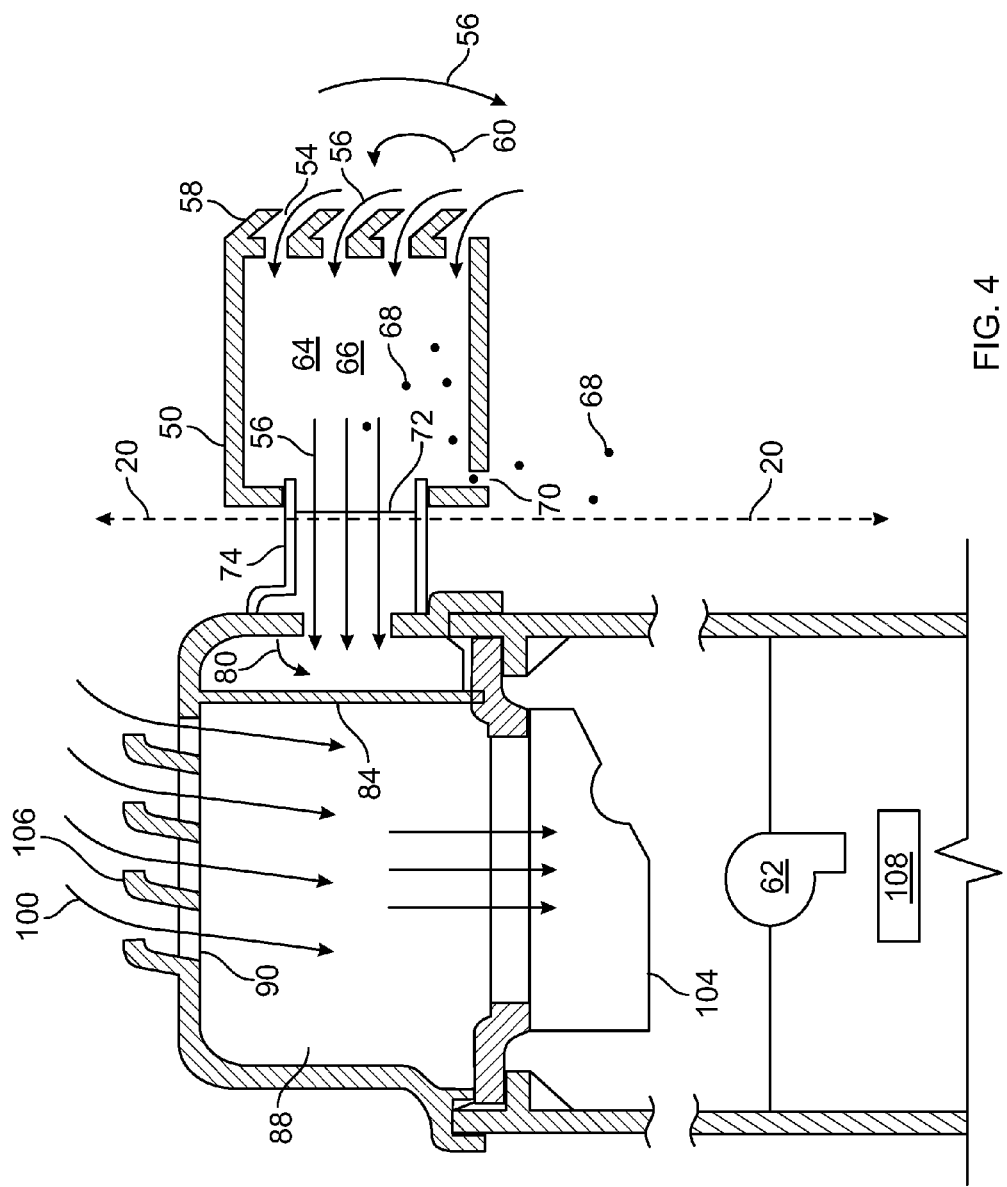
FIG. 4 is an exemplary embodiment of a forward looking view taken along line 4-4 of FIG. 2 of the present disclosure.
Figure 5:
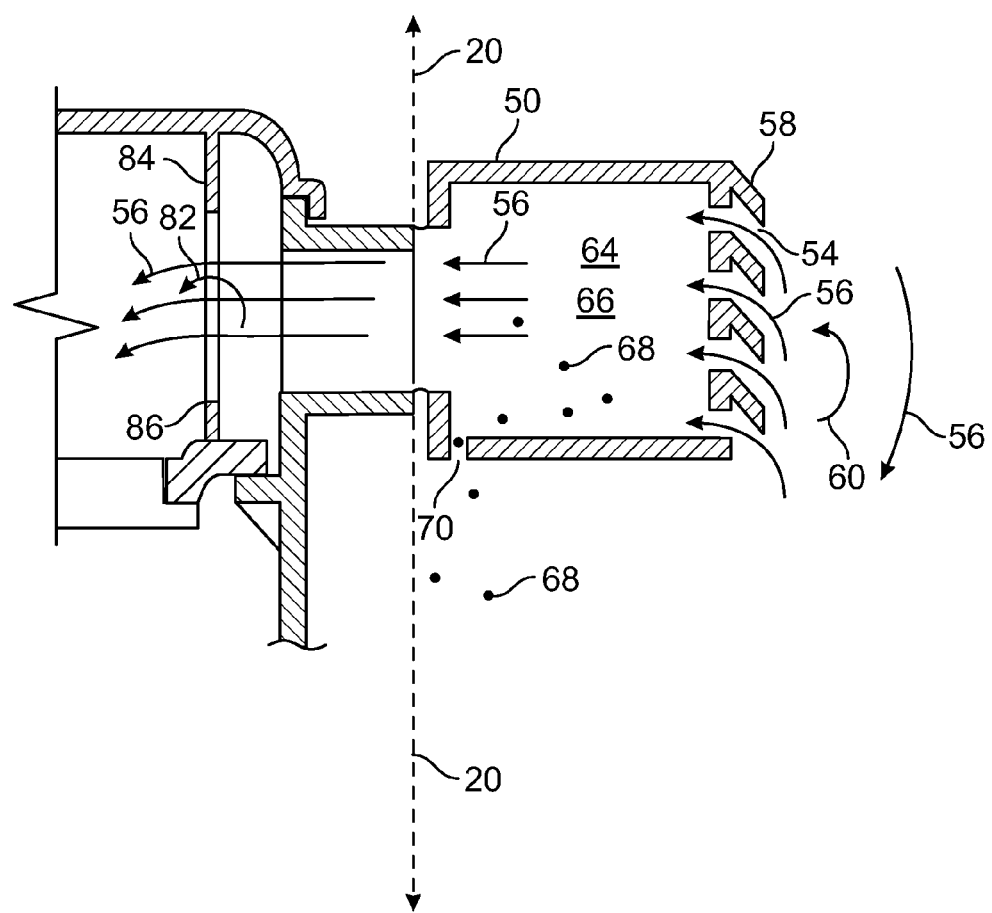
FIG. 5 is a cross-section taken along line 5-5 of FIG. 2 of the present disclosure.

As further shown FIGS. 2 and 4, upon airflow 56 passing through outlets 86 of second chamber 78 and entering third chamber 88, airflow 56 is mixed with recirculated air 100 that enters third chamber 88 through an opening 90 formed in a wall housing third chamber 88. Recirculated air 100 may be selectably brought into thermal heat exchange with one or more heat exchangers 108 of the HVAC system by selective control of the operator, to maintain a comfortable environment (temperature and humidity control) within operator cab 20.

Once recirculated air 100 and airflow 56 have mixed together in third chamber 88, becoming combined or mixed airflow 102, the combined or mixed airflow 102 is directed through a filter 104 prior to circulation in operator cab 20 by second source of moving air 62. Although filter 104 is positioned beneath third chamber 88, the filter may be arranged differently in other embodiments.

In order to provide further noise attenuation, opening 90 may include a number of louvers 106 that are directed away from the operator. In an exemplary embodiment, the louver direction is facing aft of the operator.

As shown in the figures, the second chamber and the third chamber may be formed from a single housing or structure. Stated another way, the second chamber and the third chamber may define housing having a unitary construction.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An HVAC system for a work vehicle having an operator cab comprising:
   a first chamber having an inlet for receiving a flow of air exterior of the cab and an outlet, the inlet adjacent to a first source for moving air for use independent of the HVAC system, the inlet arranged to cause a first change of direction of airflow inside the first chamber, the first chamber resulting in both a first air pressure reduction and a first reduction of airflow velocity while inside the first chamber sufficient to reduce an amount of particles entrained in the airflow while the particles are within the first chamber;
   a conduit in fluid communication between the outlet of the first chamber and an inlet of a second chamber, the second chamber configured to cause both a second change of direction and a third change of direction of airflow while inside of the second chamber;
   a third chamber configured to receive airflow from an outlet of the second chamber and to receive recirculated air from within the cab, the recirculated air brought into selective thermal heat exchange with a heat exchanger of the HVAC system by a second source for moving air, the recirculated air then entering the third chamber via an opening formed in the third chamber, the recirculated air and the airflow entering the third chamber from the second chamber mixing together; and
   a filter positioned interior of the cab and in fluid communication with the third chamber to remove at least a portion of remaining particles entrained in the mixed airflow.

2. The HVAC system of claim 1, wherein the first source for moving air is associated with cooling a motor of the work vehicle.

3. The HVAC system of claim 1, wherein the first chamber is located substantially exterior of the work vehicle.

4. The HVAC system of claim 3, wherein the first chamber comprises an aperture to remove particles from the first chamber.

5. The HVAC system of claim 4, wherein the opening in the third chamber comprises louvers facing away from an operator.

6. The HVAC system of claim 5, wherein the louvers face aft of the operator.

7. The HVAC system of claim 1, wherein the filter is positioned beneath the third chamber.

8. The HVAC system of claim 1, wherein the second change of direction of the airflow is about 90 degrees.

9. The HVAC system of claim 1, wherein the third change of direction of the airflow is about 90 degrees.

10. The HVAC system of claim 1, wherein the first chamber is removable from exterior of the cab.

11. A work vehicle comprising:
   a motor secured to a frame for activating a driving device for selectably moving the frame;
   an operator cab supported by the frame;
   an HVAC system for a work vehicle having an operator cab comprising:
      a first chamber having an inlet for receiving a flow of air exterior of the cab and an outlet, the inlet adjacent to a first source for moving air for use independent of the HVAC system, the inlet arranged to cause a first change of direction of airflow inside the first chamber, the first chamber resulting in both a first air pressure reduction and a first reduction of airflow velocity while inside the first chamber sufficient to reduce an amount of particles entrained in the airflow while the particles are within the first chamber;
      a conduit in fluid communication between the outlet of the first chamber and an inlet of a second chamber, the second chamber configured to cause both a second change of direction and a third change of direction of airflow while inside of the second chamber;

a third chamber configured to receive airflow from an outlet of the second chamber and to receive recirculated air from within the cab, the recirculated air brought into selective thermal heat exchange with a heat exchanger of the HVAC system by a second source for moving air, the recirculated air then entering the third chamber via an opening formed in the third chamber, the recirculated air and the airflow entering the third chamber from the second chamber mixing together; and a filter positioned interior of the cab and in fluid communication with the third chamber to remove at least a portion of remaining particles entrained in the mixed airflow.

12. The work vehicle of claim 11, wherein the first source for moving air is associated with cooling a motor of the work vehicle.

13. The work vehicle of claim 11, wherein the first chamber is located substantially exterior of the work vehicle.

14. The work vehicle of claim 13, wherein the first chamber comprises an aperture to remove particles from the first chamber.

15. The work vehicle of claim 14, wherein the opening in the third chamber comprises louvers facing away from an operator.

16. The work vehicle of claim 15, wherein the louvers face aft of the operator.

17. The work vehicle of claim 11, wherein the filter is positioned beneath the third chamber.

18. The work vehicle of claim 11, wherein the second change of direction of the airflow is about 90 degrees.

19. The work vehicle of claim 11, wherein the third change of direction of the airflow is about 90 degrees.

20. A work vehicle comprising:
a motor secured to a frame for selectably moving the frame;
a operator cab supported by the frame;
an HVAC system for a work vehicle having an operator cab comprising:
a first chamber having an inlet for receiving a flow of air exterior of the cab and an outlet, the inlet adjacent to a first source for moving air for use independent of the HVAC system, the inlet arranged to cause a first change of direction of airflow inside the first chamber, the first chamber resulting in both a first air pressure reduction and a first reduction of air velocity while inside the first chamber sufficient to reduce an amount of particles entrained in the airflow while the particles are within the first chamber;

a conduit in fluid communication between the outlet of the first chamber and an inlet of a second chamber, the second chamber configured to cause both a second change of direction of airflow of about 90 degrees and a third change of direction of airflow of about 90 degrees while inside of the second chamber;

a third chamber configured to receive airflow from an outlet of the second chamber and to receive recirculated air from within the cab, the recirculated air brought into selective thermal heat exchange with a heat exchanger of the HVAC system by a second source for moving air, the recirculated air then entering the third chamber via an opening formed in the third chamber, the opening in the third chamber comprises louvers facing away from an operator, the recirculated air and the airflow entering the third chamber from the second chamber mixing together; and a filter positioned interior of the cab and in fluid communication with the third chamber to remove at least a portion of remaining particles entrained in the mixed airflow.

* * * * *